US007146704B2

(12) United States Patent
Otten et al.

(10) Patent No.: US 7,146,704 B2
(45) Date of Patent: Dec. 12, 2006

(54) METHOD FOR COUPLING CONNECTORS USING AN ANTI-ROTATION DEVICE

(75) Inventors: Gregory K. Otten, Houston, TX (US); Chad Van Liere, Houston, TX (US)

(73) Assignee: Grant Prideco, L.P., Houston, TX (US)

( * ) Notice: Subject to any disclaimer, the term of this patent is extended or adjusted under 35 U.S.C. 154(b) by 0 days.

(21) Appl. No.: 10/709,655

(22) Filed: May 20, 2004

(65) Prior Publication Data

US 2005/0258640 A1 Nov. 24, 2005

(51) Int. Cl.

| | |
|---|---|
| ***B23P 11/00*** | (2006.01) |
| ***B23P 17/00*** | (2006.01) |
| ***F16L 21/00*** | (2006.01) |
| ***F16L 25/00*** | (2006.01) |

(52) U.S. Cl. ................................ 29/525.01; 29/525.11; 29/557; 285/330; 285/403; 285/404

(58) Field of Classification Search ............ 29/525.01, 29/525.11, 557; 285/330, 27, 403, 404, 90, 285/81, 82, 390, 333

See application file for complete search history.

(56) References Cited

U.S. PATENT DOCUMENTS

| | | | | |
|---|---|---|---|---|
| 18,006 | A * | 8/1857 | Allen | 285/90 |
| 1,344,774 | A * | 6/1920 | Stafford et al. | 285/90 |
| 3,472,538 | A * | 10/1969 | Wilder et al. | 285/374 |
| 3,863,959 | A * | 2/1975 | Blaschke | 285/24 |
| 4,345,785 | A * | 8/1982 | Bradford | 285/50 |
| 4,348,956 | A * | 9/1982 | Schmidlin | 102/377 |
| 4,487,433 | A * | 12/1984 | Miller | 285/81 |
| 4,902,047 | A | 2/1990 | Marietta et al. | |
| 5,149,143 | A * | 9/1992 | Howell | 285/18 |
| 5,351,999 | A * | 10/1994 | Hattori | 285/404 |
| 6,322,109 | B1 | 11/2001 | Campbell et al. | |
| 6,695,059 | B1 * | 2/2004 | Thomas et al. | 166/368 |
| 2002/0101078 | A1 * | 8/2002 | Robinson | 285/305 |
| 2003/0166418 | A1 | 9/2003 | Wentworth et al. | |

FOREIGN PATENT DOCUMENTS

| | | |
|---|---|---|
| GB | 2394237 A | 4/2004 |
| WO | WO 02/061316 A2 | 8/2002 |

OTHER PUBLICATIONS

EP 05252953, European Search Report, "Annex to the Search Report".

* cited by examiner

*Primary Examiner*—Jermie E. Cozart
(74) *Attorney, Agent, or Firm*—Jeffrey E. Daly; Williams, Morgan & Amerson, P.C.

(57) ABSTRACT

The present invention is generally directed to an anti-rotation device for mating connectors, and methods of using same. In one illustrative embodiment, the method comprises coupling a first connector to a second connector, removing at least a portion of the second connector after the first and second connectors are coupled together to thereby define a recess in the second connector, and coupling an anti-rotation member to at least one of the first and second connectors, wherein the anti-rotation member engages at least a portion of the first connector and is adapted to engage at least a portion of the recess in the second connector.

19 Claims, 14 Drawing Sheets

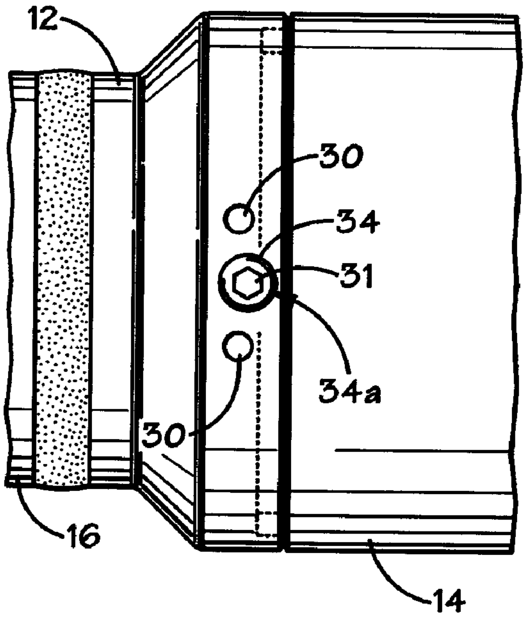
FIG. 2D
FIG. 6
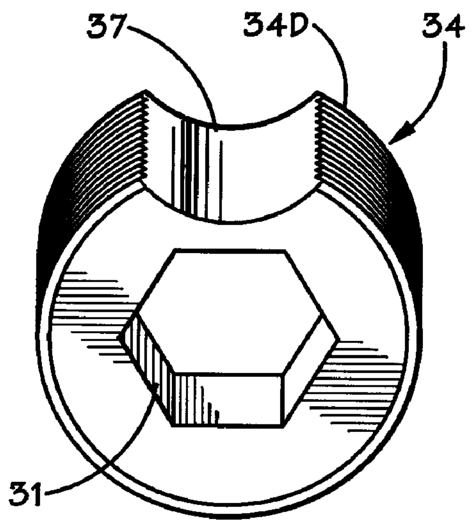
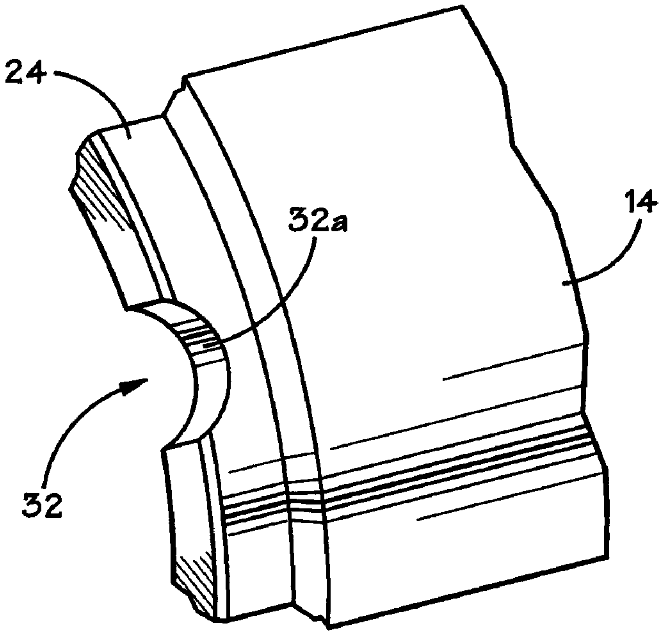
FIG. 2E

METHOD FOR COUPLING CONNECTORS USING AN ANTI-ROTATION DEVICE

BACKGROUND OF INVENTION

1. Field of the Invention

The present invention is generally directed to the field of mating connectors, and, more particularly, to an anti-rotation device for mating connectors, and methods of using same.

2. Description of the Related Art

There are many applications in a variety of industries where tubular components, e.g., pipes, are coupled to one another by mating connectors positioned on the ends of the pipes. For example, in the oil and gas industry, the process of drilling oil and gas wells involves the installation of many individual lengths of pipe. In some cases, multiple individual lengths of pipe are connected together to form one continuous pipe section. Typically, the individual lengths of pipe are threadingly coupled to one another using threaded connections welded to the ends of the individual lengths of pipe. For example, threaded connections typically consist of an externally threaded pin connector positioned on one tubular component and an internally threaded box connector positioned on another tubular component. The threaded pin is stabbed into the box and rotated until the threaded engagement is completed and such tubular components are mated together.

Even more specifically, large diameter threaded connections used for riser pipe in offshore drilling and/or used for conductor pipe for deep well drilling often have low-turn makeup characteristics. Some connections in the industry use single threads that provide multiple turns to build up considerable radial interference. Other designs use multiple start threads, resulting in near quarter turn make up. These multiple start threads have high pitches and do not build up radial interferences to the same degree as single start threads. The multiple start thread characteristics provide for quicker installation at drilling sites and are sometimes considered advantageous from a financial standpoint. However, a recurring problem and concern of standalone low-turn makeup connections is "backing out," wherein the connections disengage unintentionally resulting in potential injury, downtime and product losses. This usually happens because the radial interference is insufficient for situations of vibrations or cyclic loading on strings of pipe causing the connection to unscrew.

In many applications, once the threaded connection is made, the connected pipes experience loading conditions, e.g., vibration, cyclic loading, etc., that may tend to cause the threaded connection to loosen or, in a worst case scenario, completely disengage. For example, in the oil and gas industry, once the pipes are threadingly coupled to one another, the pipes may be moved or handled using a variety of pipe handling equipment. Given such handling, the threaded connection may tend to loosen or become disengaged. Additionally, pipes positioned within a subterranean wellbore may be subjected to significant loading that may cause high stress and the possibility of the threaded connector loosening or separating. Such loosening or disengaging of mated connections is undesirable for several reasons. First, if the integrity of the mated connection is not maintained, fluids flowing within the mated pipe lengths may be allowed to escape through the loosened connection. Additionally, in a worst case scenario, complete separation of the threaded connection can cause severe damage to the operating equipment and/or personnel. Thus, there is a need for a device to prevent or reduce the likelihood that mated connections for tubular components will become loose or disengaged during use.

The present invention is directed to a device and various methods that may solve, or at least reduce, some or all of the aforementioned problems.

SUMMARY OF INVENTION

The present invention is generally directed to various embodiments of an anti-rotation device for mating connectors, and various methods of using same. In one illustrative embodiment, the method comprises coupling a first connector to a second connector, removing at least a portion of the second connector after the first and second connectors are coupled together to thereby define a recess in the second connector, and coupling an anti-rotation member to at least one of the first and second connectors, wherein the anti-rotation member engages at least a portion of the first connector and is adapted to engage at least a portion of the recess in the second connector.

In another illustrative embodiment, the method comprises coupling a first connector to a second connector, removing at least a portion of the second connector after the first and second connectors are coupled together to thereby define a recess in the second connector, and threadingly coupling an anti-rotation member to the first and second connectors.

In yet another illustrative embodiment, the method comprises coupling a first connector to a second connector, the first connector having an opening formed therein, after the first and second connectors are coupled together, removing at least a portion of the second connector positioned within an area defined by the opening, and inserting an anti-rotation member in the opening wherein the anti-rotation member engages at least a portion of the first connector and is adapted to engage at least a portion of the recess in the second connector.

In one illustrative embodiment of the present invention, the device comprises a first connector, a second connector, the second connector being coupled to the first connector, and an anti-rotation member threadingly coupled to a threaded opening defined in the first connector, the anti-rotation member adapted to engage at least a portion of the second connector.

In another illustrative embodiment, the device comprises a first connector having a threaded opening formed therein, a second connector having a recess with a threaded surface formed therein, the second connector being coupled to the first connector, and an anti-rotation member threadingly coupled to the threaded opening in the first connector and to the threaded surface of the recess in the second connector.

BRIEF DESCRIPTION OF DRAWINGS

The invention may be understood by reference to the following description taken in conjunction with the accompanying drawings, in which like reference numerals identify like elements.

FIGS. 2A–2D are exterior views of the illustrative first and second connectors in correspondence with FIGS. 1A–1D, respectively.

FIG. 2E is a view of an illustrative connector having a portion of the connector removed in accordance with the embodiments of the invention described herein.

FIG. 6 depicts another illustrative embodiment of an anti-rotation member that may be employed with the present invention.

Figure 1A:
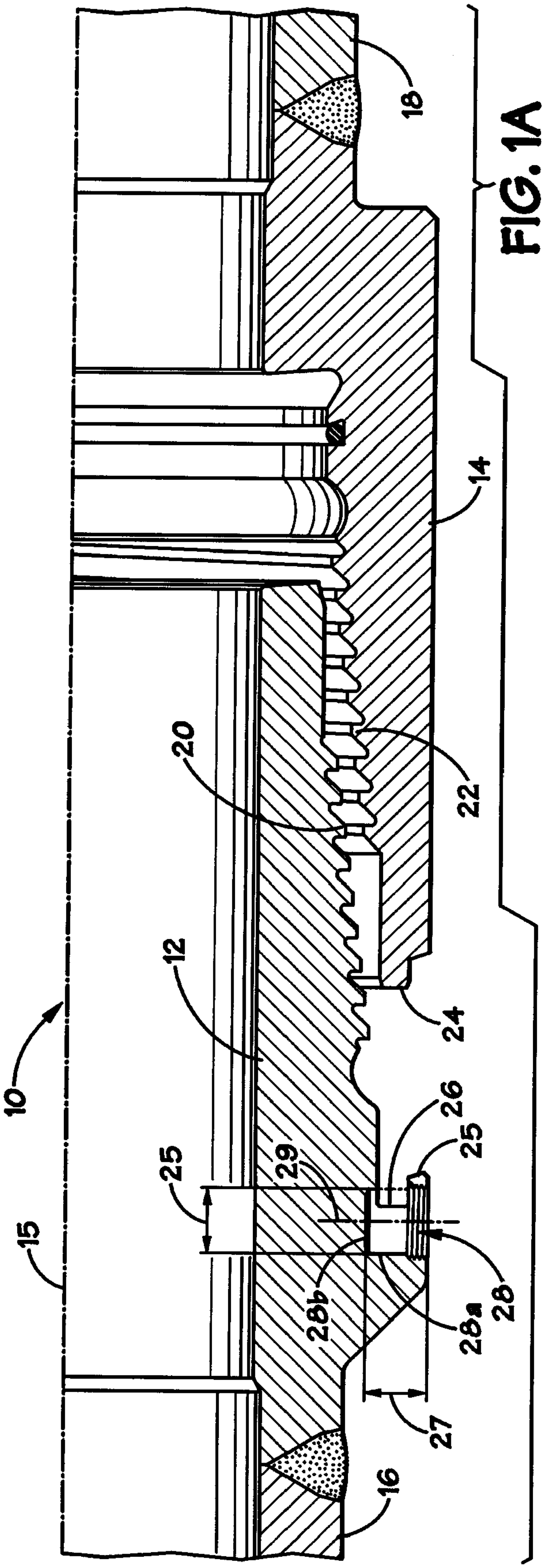
FIGS. 1A–1D are cross-sectional view of illustrative first and second connectors that may be provided with one of more of the anti-rotation devices described herein.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers" specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached drawings which are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In general, the present invention is directed to various embodiments of an anti-rotation device for mated connectors and various methods of using such anti-rotation devices. As will be recognized by those skilled in the art after a complete reading of the present application, the invention as described herein may be used with a variety of different types of connectors in a variety of different industries. Thus, although illustrative examples will be provided herein, the present invention should not be considered as limited to any particular type or structure of such connectors unless such limitations are expressly recited in the appended claims.

In general, the present invention involves installation of an anti-rotation device that is adapted to engage at least portions of both of the mated connectors. One embodiment of the present invention will now be disclosed with reference to FIGS. 1A–1D and FIGS. 2A–2E. FIGS. 1A–1D are cross-sectional views of one-half of a mated connection between an illustrative first connector 12 and a second connector 14. FIGS. 2A–2D are external views of the mated connectors that correspond, respectively, to FIGS. 1A–1D.

Figure 2A:
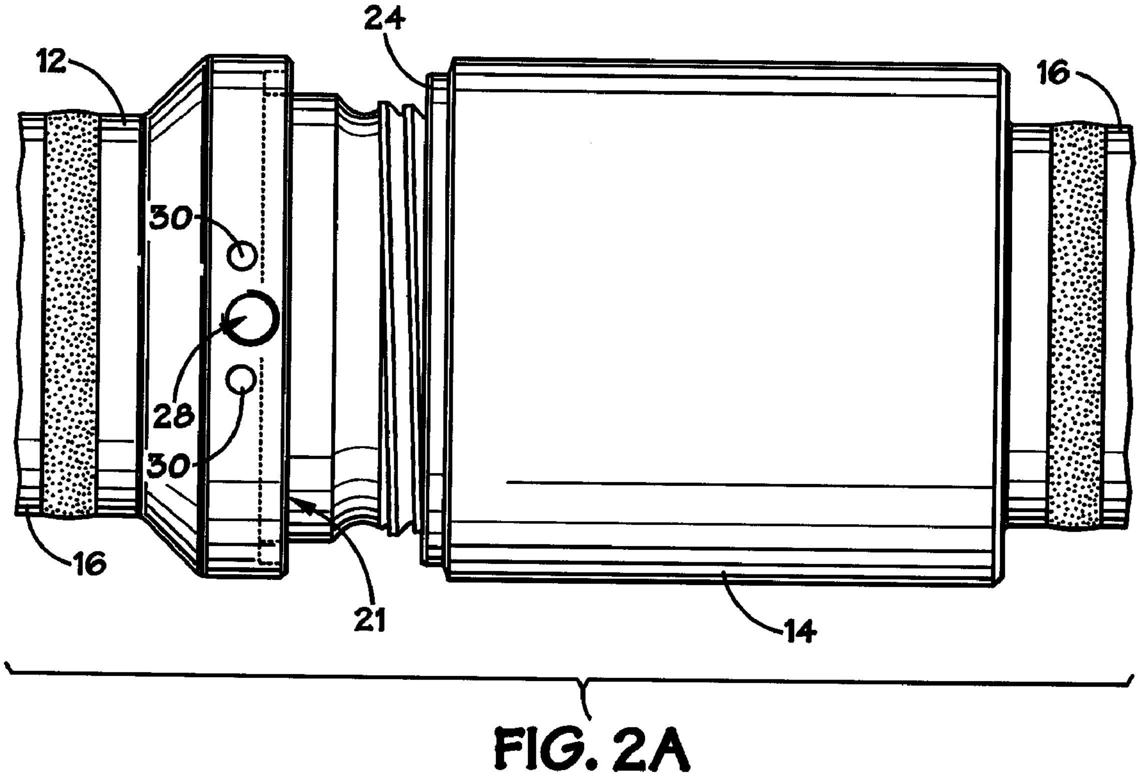

As indicated in FIGS. 1A and 2A, in one illustrative embodiment, a threaded connector assembly 10 is comprised of a first connector 12 that is adapted to be threadingly coupled to a second connector 14. In the illustrative embodiment depicted herein, the first connector 12 is coupled to a length of pipe 16, and the second connector 14 is coupled to another pipe length 18. In one illustrative embodiment, the first connector 12 is a pin connector having a plurality of external threads 20 formed thereon, and the second connector 14 is a box connector having a plurality of internal threads 22 formed thereon. The external threads 20 and the internal threads 22 are adapted to threadingly engage one another as the first and second connectors 12, 14 are coupled to one another. In the illustrative embodiment depicted in FIG. 1A, the second connector 14 further comprises a lip 24 that is adapted to extend at least partially into a groove 26 formed in the first connector 12 when the first and second connectors 12, 14 are threadingly coupled to one another. The first connector 12 further comprises an opening 28 that is adapted to receive an anti-rotation member 34 (see FIGS. 1D and 2D), as described more fully below. FIGS. 1A and 2A depicts the first and second connectors 12, 14 in a spaced-apart relationship. As shown in FIG. 2A, one or more anti-rotation openings 28 may be formed in the first connector 12. For example, in some applications, the first connector 12 may have 1–4 such openings 28 formed therein, and they may be equally spaced around the perimeter of the first connector 12. Additionally, as depicted in FIG. 2A, two anti-torque holes 30 are formed in the first connector 12 adjacent each of the openings 28. The two holes 30 may be of different diameters for alignment orientation. As described more fully below, the anti-torque holes 30 will be used in one illustrative method of installing the anti-rotation member 34.

The size, shape, location and orientation of the opening 28 relative to the centerline 15 of the first connector 12 may vary depending upon the particular application. In the illustrative embodiment depicted in FIGS. 1A–1D, the opening 28 is a generally circular shaped opening. In one illustrative embodiment, the opening 28 may have a diameter 25 that ranges from approximately 0.5–1.5 inches and a depth 27 that ranges from approximately 0.25–1.5 inches. In one particularly illustrative embodiment, the opening 28 has a diameter 25 of approximately 0.75 inches and a depth of approximately 0.6 inches. As described more fully below, in various illustrative embodiments, all or a portion of the inner surface 28*a* of the opening 28 may be threaded. A lubricating coating, e.g., encapsulated Loctite, may be applied to the internally threaded opening 28 after the threads are formed. Also note that, in the illustrative embodiment depicted herein, the longitudinal axis 29 of the opening 28 is approximately normal to the longitudinal centerline 15 of the first connector 12. However, depending upon the particular application, the orientation of the opening 28 may vary from this illustrative example. The opening 28 may be formed using a variety of known techniques.

Figure 1B:
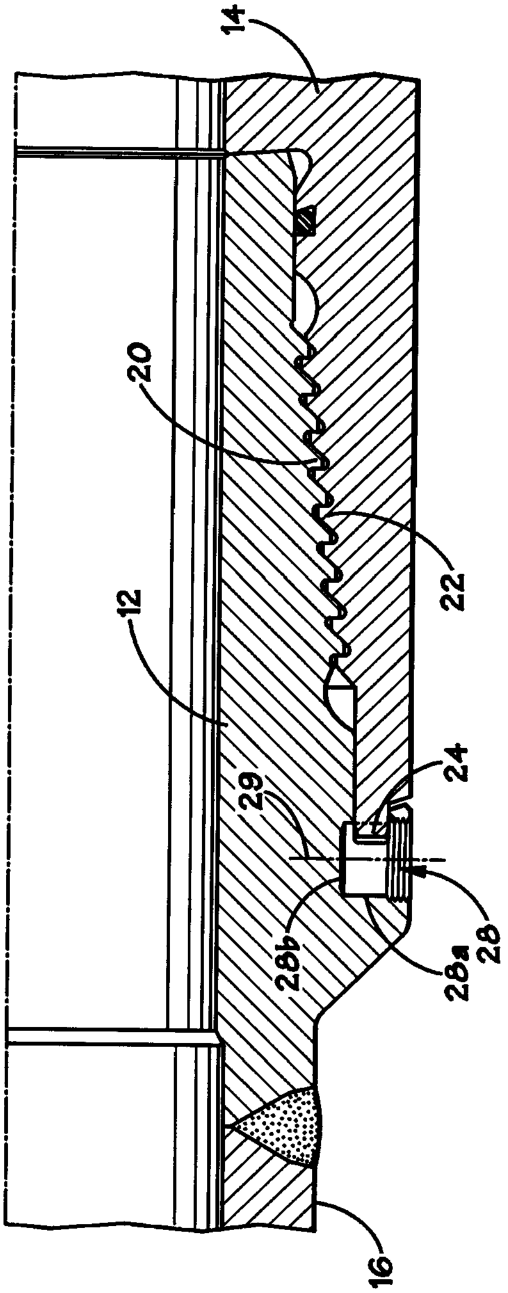
Figure 2B:
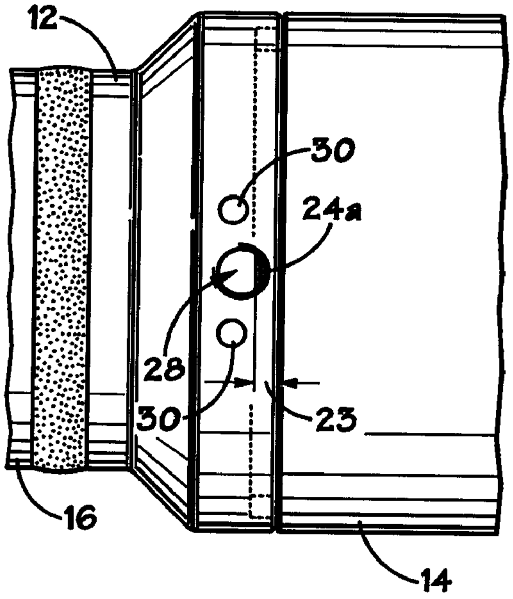

FIGS. 1A and 2A depict the example where the first and second connectors 12, 14 are in a spaced-apart relationship. FIGS. 1B and 2B depict the illustrative example where the first and second connectors 12, 14 are threadingly coupled to one another by engagement of the threads 20, 22. Note that, in this position, the lip 24 on the second connector 14 extends into the groove 26 formed in the first connector 12. Also note that, as indicated in FIG. 2B, a portion 24*a* of the lip 24 of the second connector 14 is positioned within the area defined by the opening 28 formed in the first connector 12. As will be recognized by those skilled in the art after a complete reading of the present application, the amount 23 by which the lip 24 of the second connector 14 extends into the area defined by the opening 28 may vary depending upon the particular application. In one particularly illustrative embodiment, the distance 23 may be approximately 0.125 inches. As a general guideline, in some cases, the opening 28 may be positioned such that the distance 23 equals approximately 20–25% of the diameter 25 of the opening 28. However, it should also be understood that the present invention is not limited to the use with connectors 12, 14 wherein the connectors engage one another in a tongue and groove configuration such as that represented by the positioning of the lip 24 within the groove 26. Rather, as will be recognized by those skilled in the art after a complete reading of the present application, the present invention has broad application to connectors having a variety of different configurations. Thus, the present invention should not be considered as limited to the illustrative connector examples described herein.

Figure 1C:
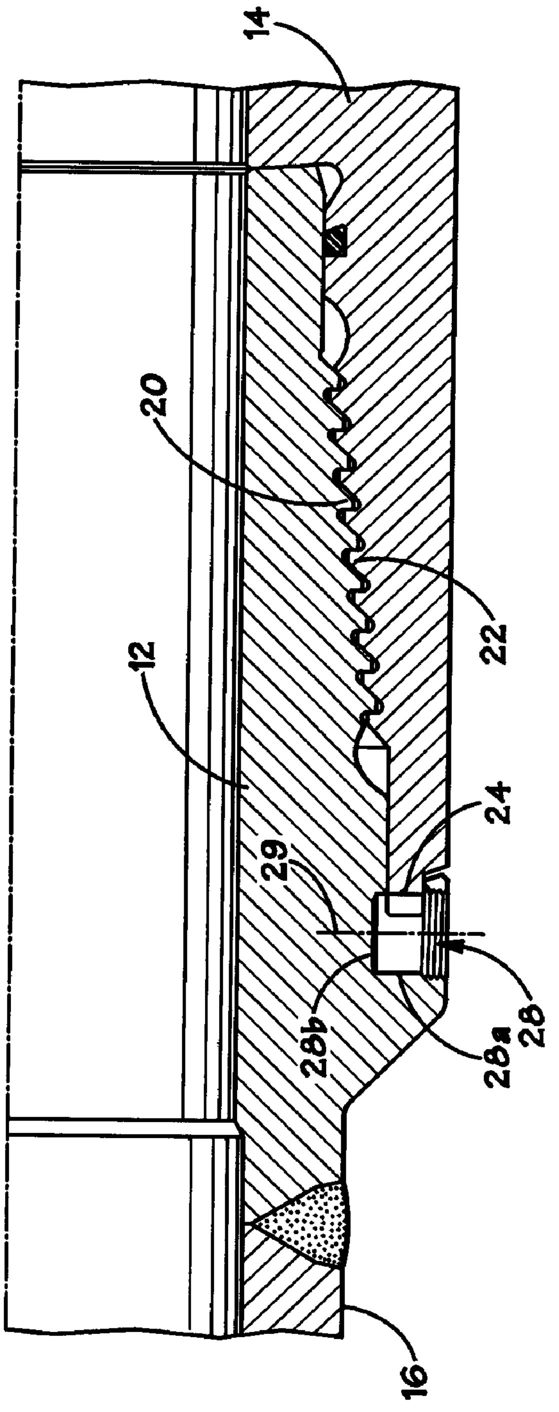
Figure 1D:
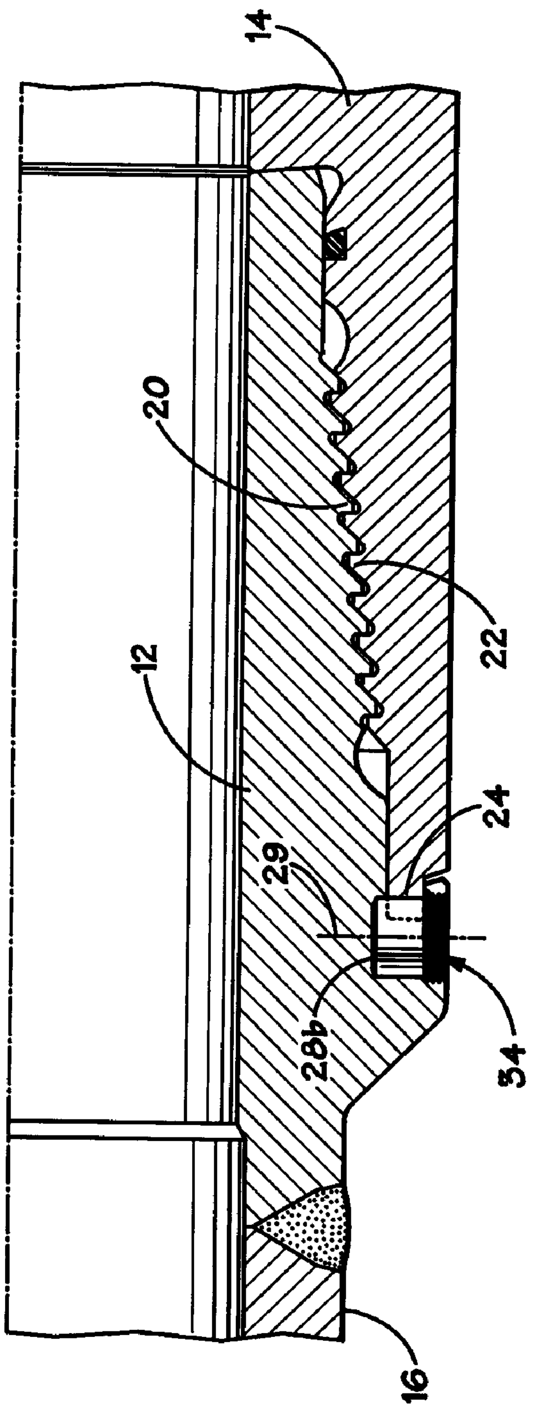
Figure 2C:
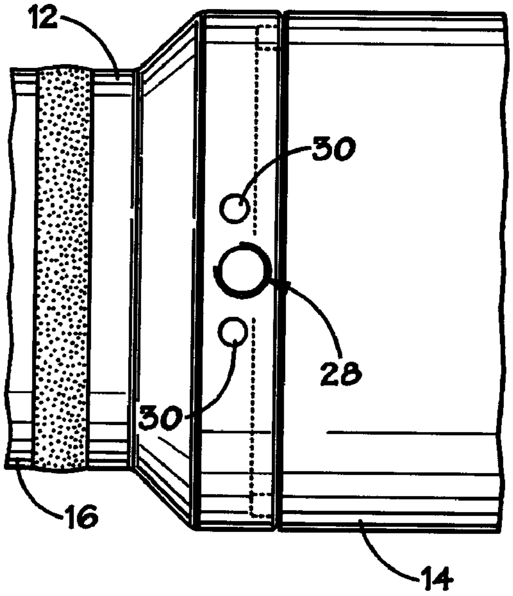

As described more fully below, after the first and second connectors 12, 14 are coupled to one another, at least a portion of the second connector 14 will be removed to facilitate installation of the anti-rotation member 34. In the particularly illustrative example depicted herein, the portion 24*a* of the lip 24 that is within the area defined by the opening 28 will be removed. The removal process may be accomplished by any technique. For example, a drilling and/or milling operation may be performed to remove the desired portion of the second connector. FIG. 2E is a drawing depicting the lip 24 of the second connector 14 after this portion 24*a* of the lip 24 has been removed. The process results in the definition of a recess or scalloped region 32, having a surface 32A, in the lip 24 of the second connector 14. FIGS. 1C and 2C depict the mated first and second connectors 12, 14 after the portion 24*a* of the lip 24 of the second connector 14 has been removed or trimmed. After this process has been performed, an anti-rotation member 34 may be positioned within the opening 28 in such a manner that it engages at least a portion of both the first and second connectors 12, 14 to thereby prevent or reduce undesirable rotation of the first and second connectors 12, 14. More specifically, in the depicted embodiment, the anti-rotation member 34 is sized and configured such that it engages portions of the first pin connector 12 and at least a portion of the recess 32 (see FIG. 2E) formed in the lip 24 of the second connector 14.

In some cases, the anti-rotation member 34 is threadingly coupled to the opening 28 along at least some of the depth of the opening 28. In other cases, the anti-rotation member 34 is threadingly coupled to the opening 28 and to the surface 32A of the recess 32 formed in the second connector 14. The anti-rotation member 34 may be of any desired shape or configuration, and it may be installed in any manner so as to engage at least portions of the first and second connectors 12, 14 to thereby prevent or reduce undesired rotation or disengagement between the first and second connectors 12, 14. In one particular illustrative embodiment, the anti-rotation member 34 may comprise a threaded device or pin that is threadingly engaged with at least portions of the first connector 12 and/or threadingly engaged with both the first connector 12 and the second connector 14. As described more fully below, in one illustrative embodiment, the anti-rotation member 34 may be removable such that the connectors 12, 14 may be decoupled from one another. For example, the anti-rotation member 34 may be provided with a socket recess 31 (see FIG. 2D) for installing and removing the anti-rotation member 34 from the opening 28.

In one illustrative embodiment, the anti-rotation member 34 is comprised of a material that has a greater yield strength and/or hardness as compared to the material of the first and second connectors 12, 14. In one illustrative embodiment, the anti-rotation member 34 may be approximately 20% harder than the material of the first and second connectors 12, 14. Stated another way, the anti-rotation member 34 may have a yield strength that is at least 10 ksi greater than the yield strength of the material of the first and second connectors 12, 14. In one particularly illustrative embodiment, the anti-rotation member 34 may be comprised of a tool steel having a yield strength of at least 45–80 ksi and a hardness of approximately 45–60 Rockwell C. In some cases, the anti-rotation member 34 may be made of a powdered metal.

Figure 3B:
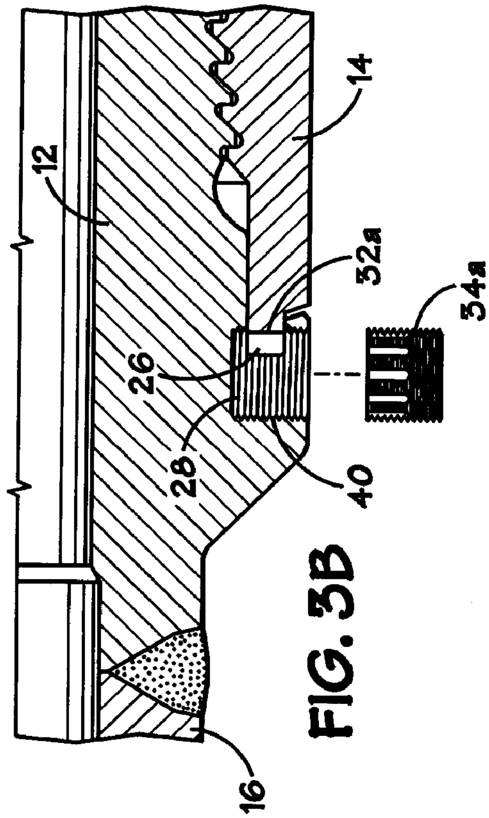
FIGS. 3A–3D depict one illustrative embodiment of an anti-rotation member positioned between first and second connectors.
Figure 3D:
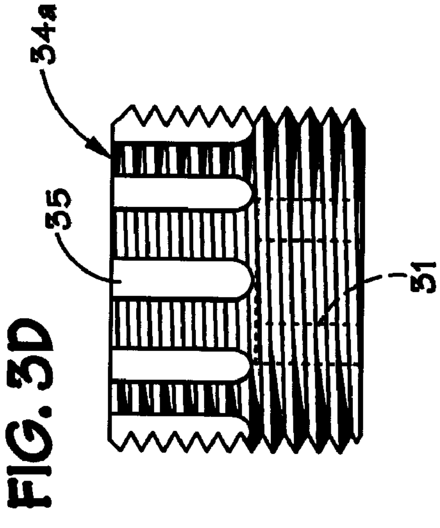
Figure 3A:
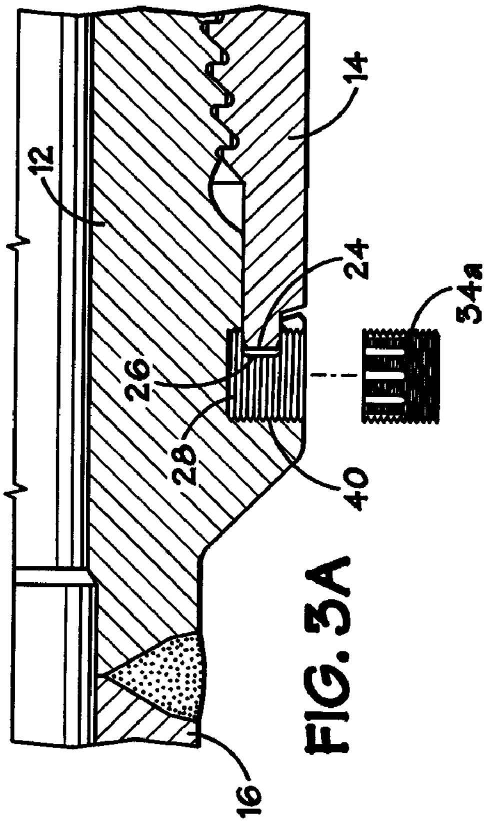
Figure 3C:
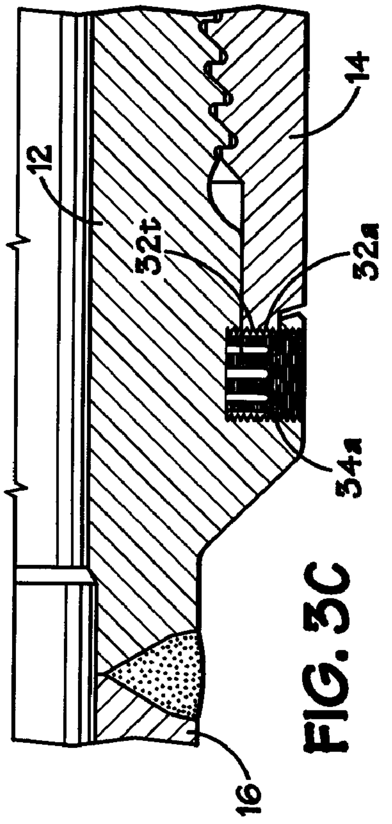

As indicated previously, the anti-rotation member 34 may have a variety of configurations and it may be installed using a variety of techniques. FIGS. 3A–3D depict one illustrative embodiment wherein the anti-rotation member 34 is a tapping fastener 34*a* that may be installed in accordance with the methodology described therein. As shown in FIG. 3D, the tapping fastener 34*a* has a plurality of flutes 35 formed therein to allow metal shavings and debris to be removed as the tapping fastener 34*a* is installed. FIG. 3A depicts the situation where the first and second connectors 12, 14 are threadingly coupled to one another and at least a portion of the second connector 14 needs to be removed after the first and second connectors 12, 14 are coupled to one another to thereby allow the installation of the anti-rotation member 34*a* as described herein. With reference to the specific embodiment disclosed herein, in FIG. 3A, the lip 24 of the second connector 14 is positioned within the groove 26 of the first connector 12. In this particular embodiment, a plurality of threads 40 are formed throughout substantially the entire depth of the opening 28. Next, as indicated in FIG. 3B, using the methodologies described more fully below, the portion 24*a* of the lip 24 lying within the area defined by the opening 28 is removed or trimmed. This trimming process is performed such that the surface 32*a* of the recess 32 formed in the lip 24 is adapted to be threaded, i.e., tapped, using the tapping fastener 34*a*. FIG. 3C depicts the illustrative anti-rotation device 34*a* in the installed position whereby it prevents or reduces the possibility of undesirable loosening or disengagement of the first and second connectors 12, 14. Note that, as the anti-rotation member 34*a*, i.e., the tapping fastener, is installed, threads 32*t* are formed on the surface 32*a* of the recess 32 formed in the second connector 14.

Figure 4B:
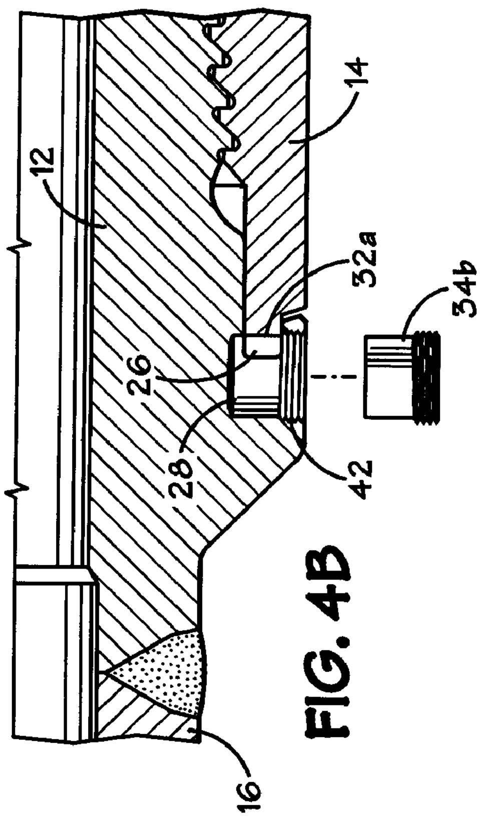
FIGS. 4A–4D depict another illustrative embodiment of an anti-rotation member positioned between first and second connectors.
Figure 4D:
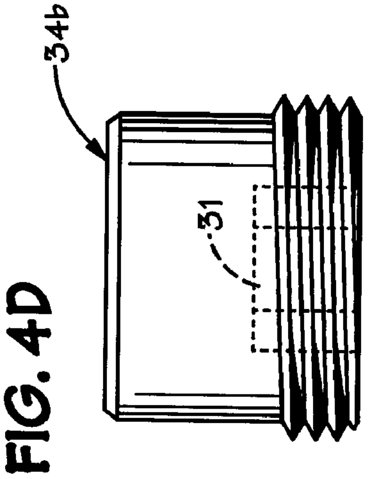
Figure 4A:
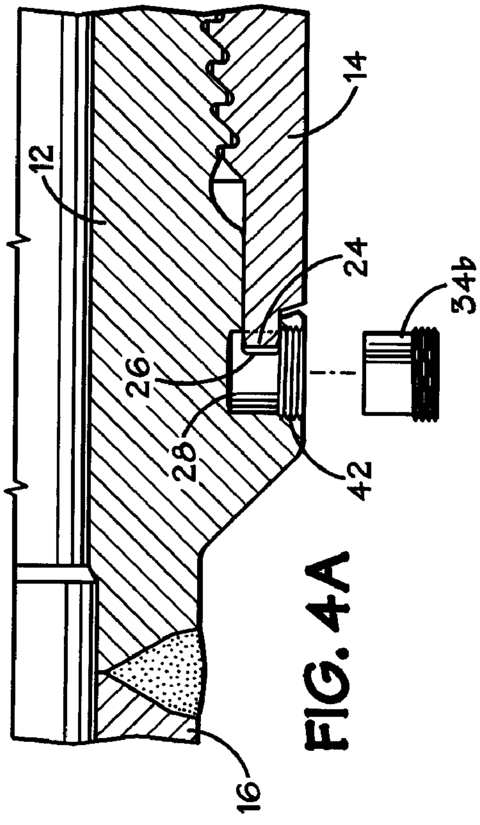
Figure 4C:
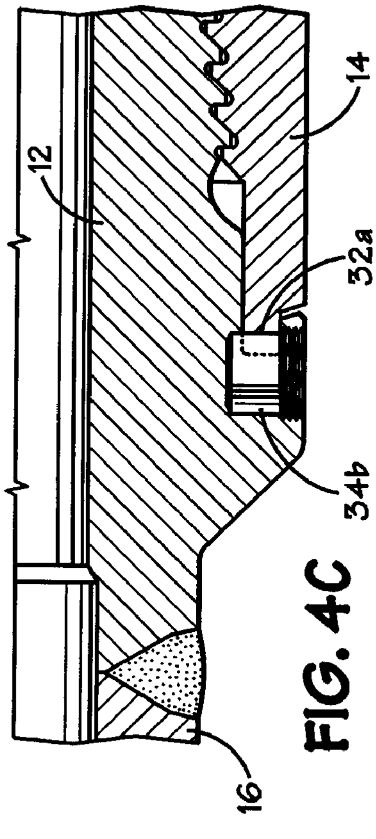

FIGS. 4A–4D depict another illustrative embodiment where the anti-rotation member 34 is a threaded fastener 34*b*. FIG. 4A depicts the situation where the first and second connectors 12, 14 are threadingly coupled to one another. As shown therein, the lip 24 extends into the groove 26 of the first connector 12. At least a portion of the opening 28 is provided with internal threads 42 that are adapted to threadingly engage the anti-rotation member 34*b*. FIG. 4B depicts the situation after the portion 24*a* of the lip 24 of the second connector 14 has been trimmed to define the surface 32*a* using the methodologies described further herein. FIG. 4C depicts the anti-rotation member 34*b* in the installed position wherein it engages at least a portion of the first and second connectors 12, 14. More specifically, in this illustrative embodiment, the anti-rotation member 34*b* is threadingly coupled to the threaded opening 28 and merely engages a portion of the surface 32*a* of the second connector 14. Note that, in the embodiment depicted in FIGS. 4A–4D, the entire depth of the opening 28 need not be threaded.

Figure 5B:
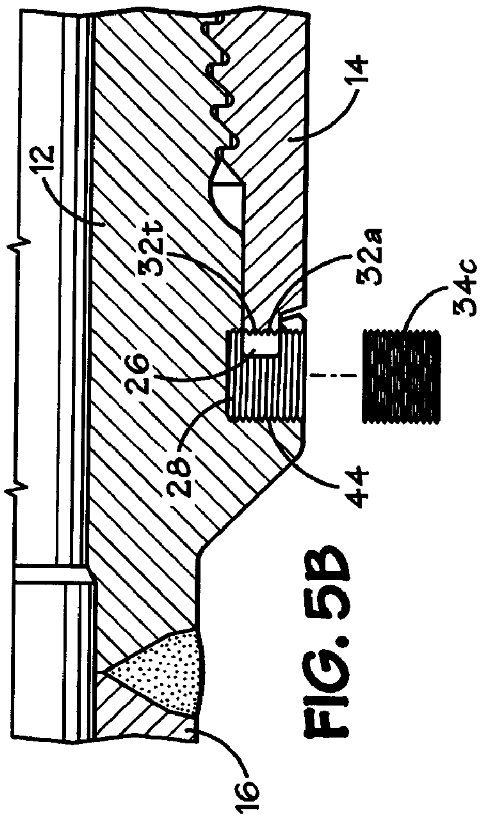
FIGS. 5A–5D depict yet another illustrative embodiment of an illustrative anti-rotation member provided between the first and second connectors.
Figure 5D:
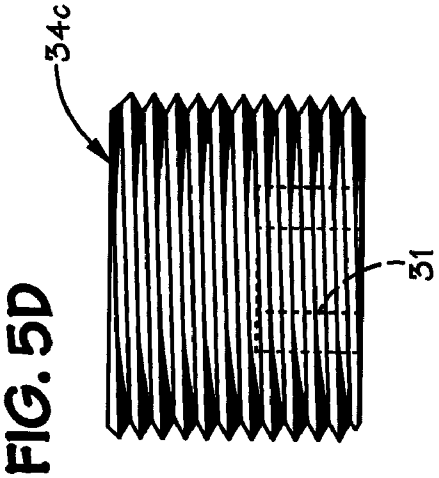
Figure 5A:
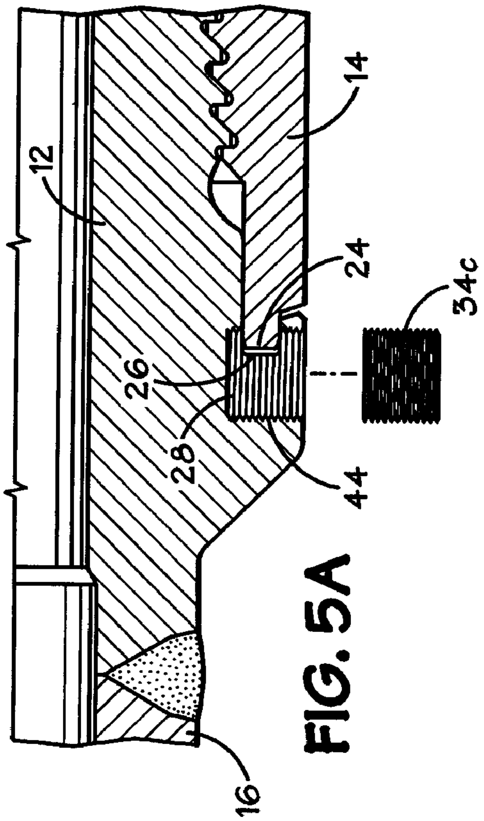
Figure 5C:
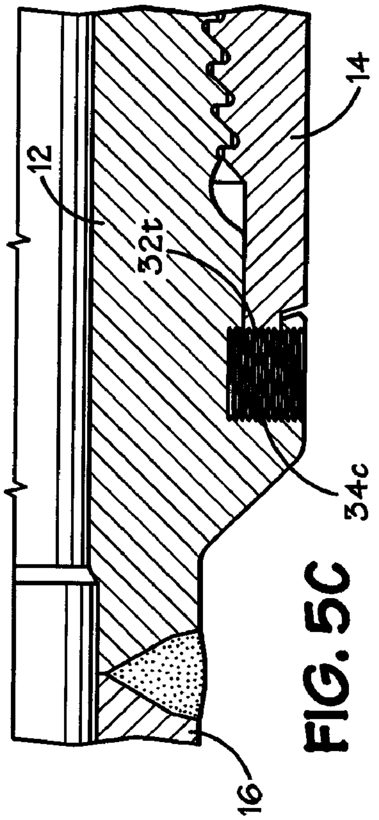

FIGS. 5A–5D depict yet another illustrative embodiment of the present invention. As shown therein, the anti-rotation member 34 comprises a set screw 34*c*. As indicated in FIG. 5A, the first and second connectors 12, 14 are threadingly coupled to one another, and the lip 24 of the second connector 14 is positioned within the groove 26 formed in the first connector 12. The opening 28 in the first connector 12 is provided with internal threads 44 for approximately the entire depth of the opening 28. Next, the portion 24*a* of the lip 24 extending into the area defined by the opening 28 is removed using the methodologies described below. Thereafter, although not indicated in the drawings, a tapping tool is used to form threads 32*t* on the trimmed surface 32*a* of the recess 32 formed in the lip 24. After the threads 32*t* are formed on the trimmed surface 32*a*, the set screw 34*c* may be threadingly engaged with the opening 28 wherein it threadingly engages at least a portion of the first connector 12 and at least a portion of the second connector 14 as depicted in FIG. 5C.

FIG. 6 depicts yet another illustrative embodiment of the anti-rotation member 34. As shown therein, the anti-rotation member 34 is a combination set screw and tap 34*d*. A single gullet 37 is provided to allow for removal of cuttings and debris. A recessed socket 31 is provided for rotating the member 34*d*.

In the various embodiments described above, the size, type and pitch of the threads formed in the opening 28 and, in some cases, on the surface 32*a* of the recess 32 formed in the lip 24 may vary depending upon the particular application. In one illustrative embodiment, the threads are ¾" UNF threads having a pitch of approximately 16 threads per inch.

As indicated above, the present invention involves, in one illustrative embodiment, removal of a portion of the second connector 14 after the first and second connectors 12, 14 are coupled to one another to allow the installation of an anti-rotation member 34. In the illustrative embodiment depicted herein, the portion 24*a* of the lip 24 that is positioned within the area defined by the opening 28 formed in the first connector 12 is removed. The removal of the portion 24*a* of the second connector 14 may be accomplished by any of a variety of techniques that are effective for accomplishing the purposes described herein. For example, the removal process may be a drilling process, a milling process, or a combination of both. In one illustrative embodiment, an illustrative device 100 shown in FIGS. 7A–7E is employed for such purposes. As shown therein, the device 100 comprises a pneumatic drill 102, a body bracket 104, a plurality of splines 110, an anvil bracket 126, a drill 103 and a plurality of pins 116. The drill 103 is provided with a blunt end 103*a*. The body bracket 104 is coupled to the drill 102 by a plurality of threaded fasteners 106 (see FIG. 7B). A plurality of spline bushings 108 are press fit into the body bracket 104 and the spline bushings 108 are adapted to receive the splines 110 positioned therein. The splines 110 are adapted to move axially within the spline bushings 108. A drill bushing 114 (see FIGS. 7A and 7D) is positioned in the anvil bracket 126. The drill bushing 114 is adapted to allow the drill 103 to move axially within the bushing 114 while maintaining the drill 103 in vertical alignment. In one illustrative embodiment, the drill 102 may be a 500 rpm, ½ inch pneumatic drill, Model No. K344 manufactured by Viking Air Tool.

The device 100 further comprises a spring 120 positioned around each of the splines 110 and a plurality of shaft collars 124 that is secured to the splines 110 with a set screw (not shown). The purpose of the springs 120 is to insure that the drill 103 is retracted into the anvil bracket 126 when the drill 103 is not in use. More specifically, the springs 120 insure that the end 103*a* of the drill 103 is approximately flush with the surface 127 of the anvil bracket 126. The device 100 further comprises a plurality of alignment pins 118 positioned in the anvil bracket 126. As indicated in FIG. 7E, the pins 116 are adapted to be positioned in the anti-torque holes 30 formed in the first connector 12. The pins 116 are adapted to resist the rotational torque exerted when the drill 102 is used to remove the portion 24*a* of the lip 24 lying within the area defined by the opening 28 in the first connector 12. The pins 118 are adapted to engage the outer surface 17 of the first connector 12 to thereby provide vertical alignment of the drill 102.

Figure 7A:
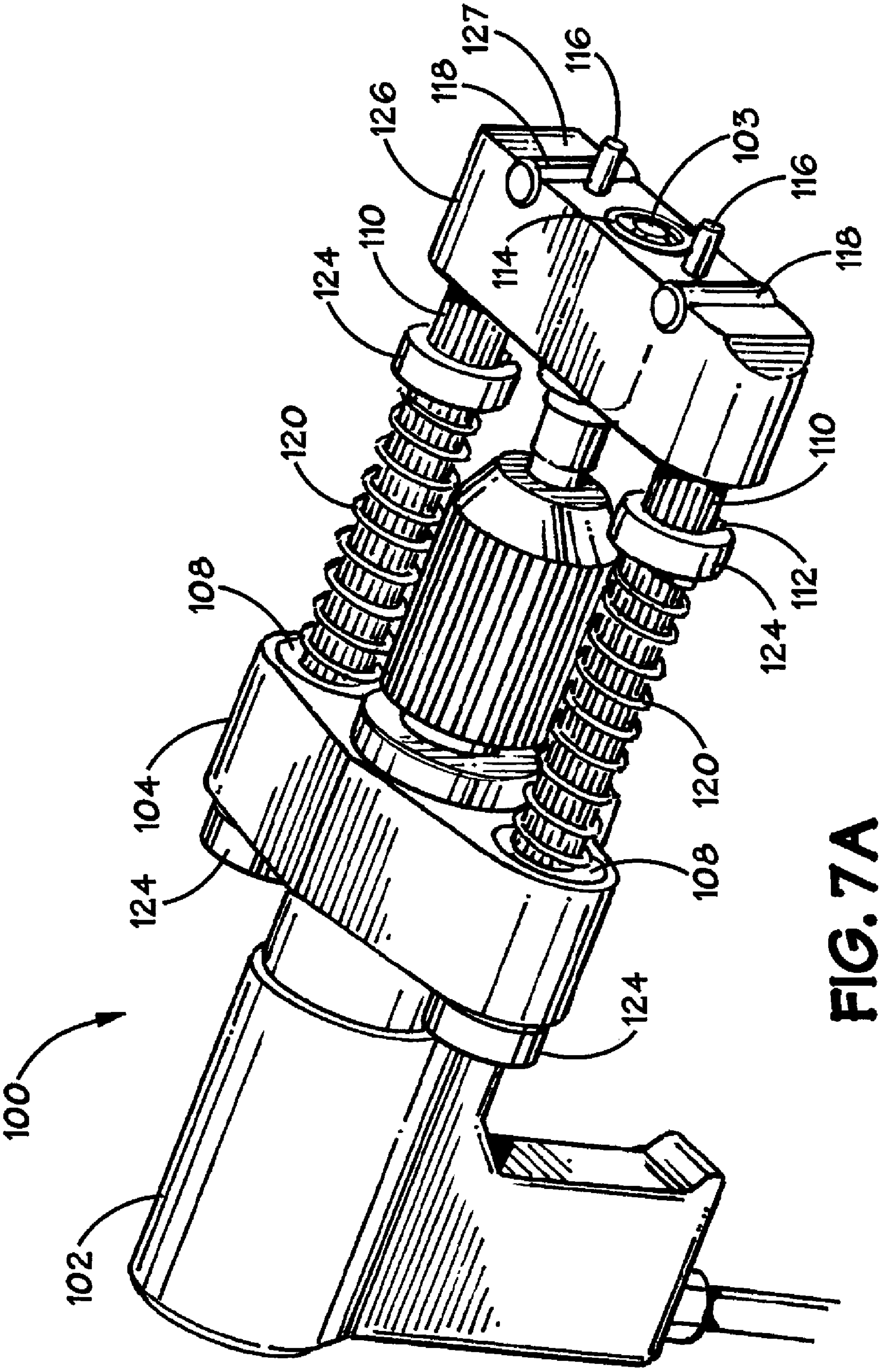
FIGS. 7A–7E depict an illustrative device that may be used in installing the illustrative anti-rotation members described herein.
Figure 7B:
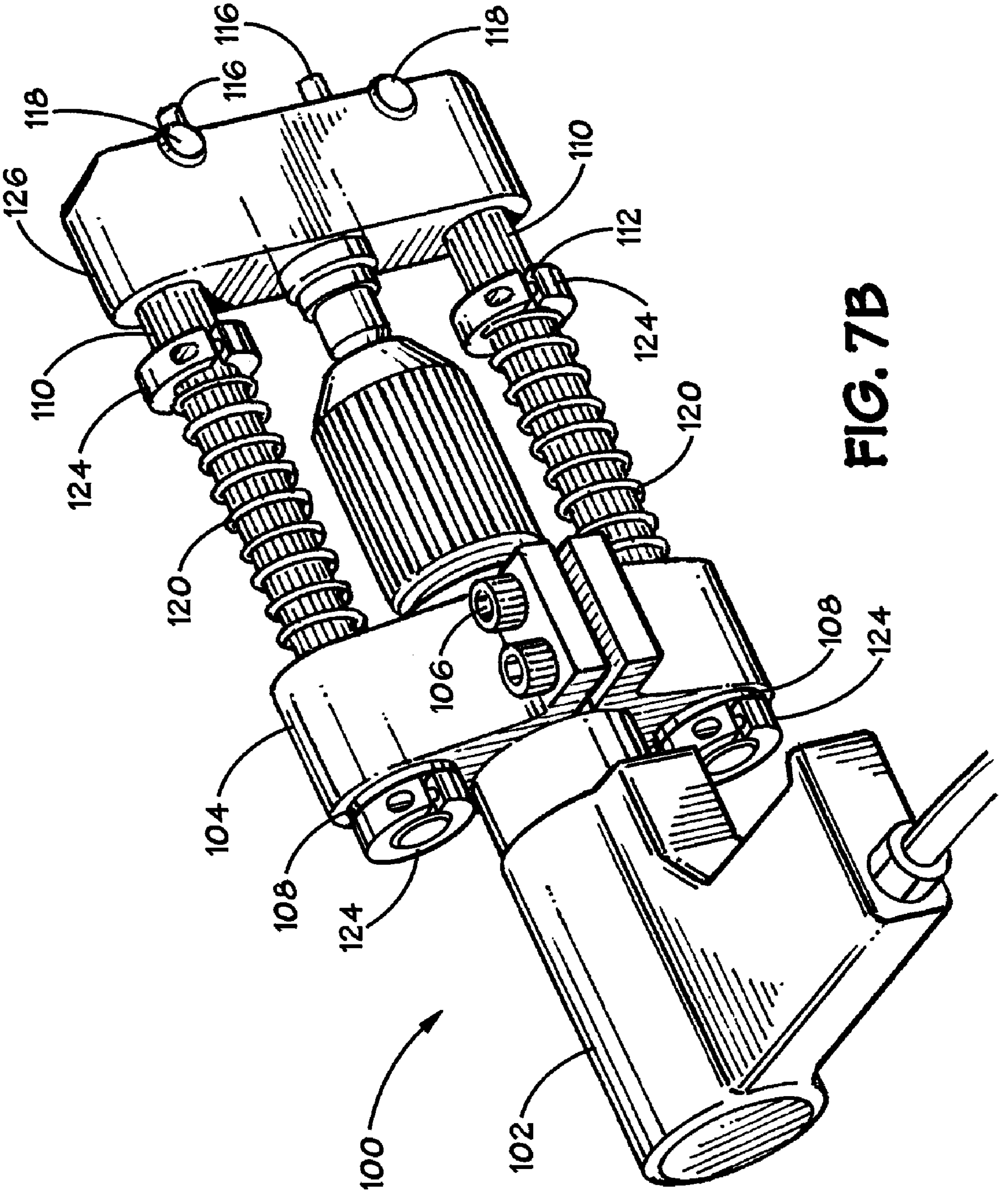
Figure 7C:
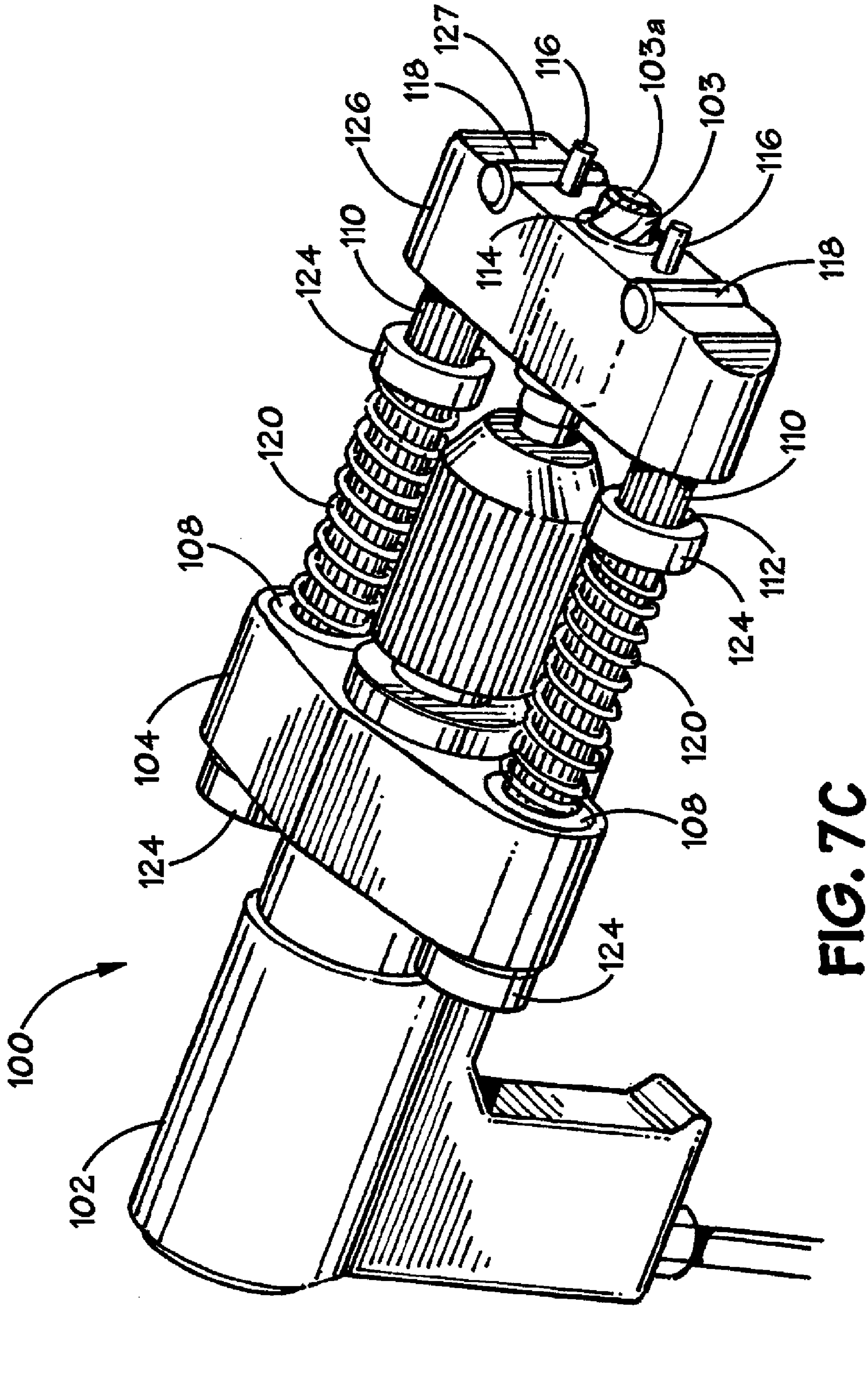
Figure 7D:
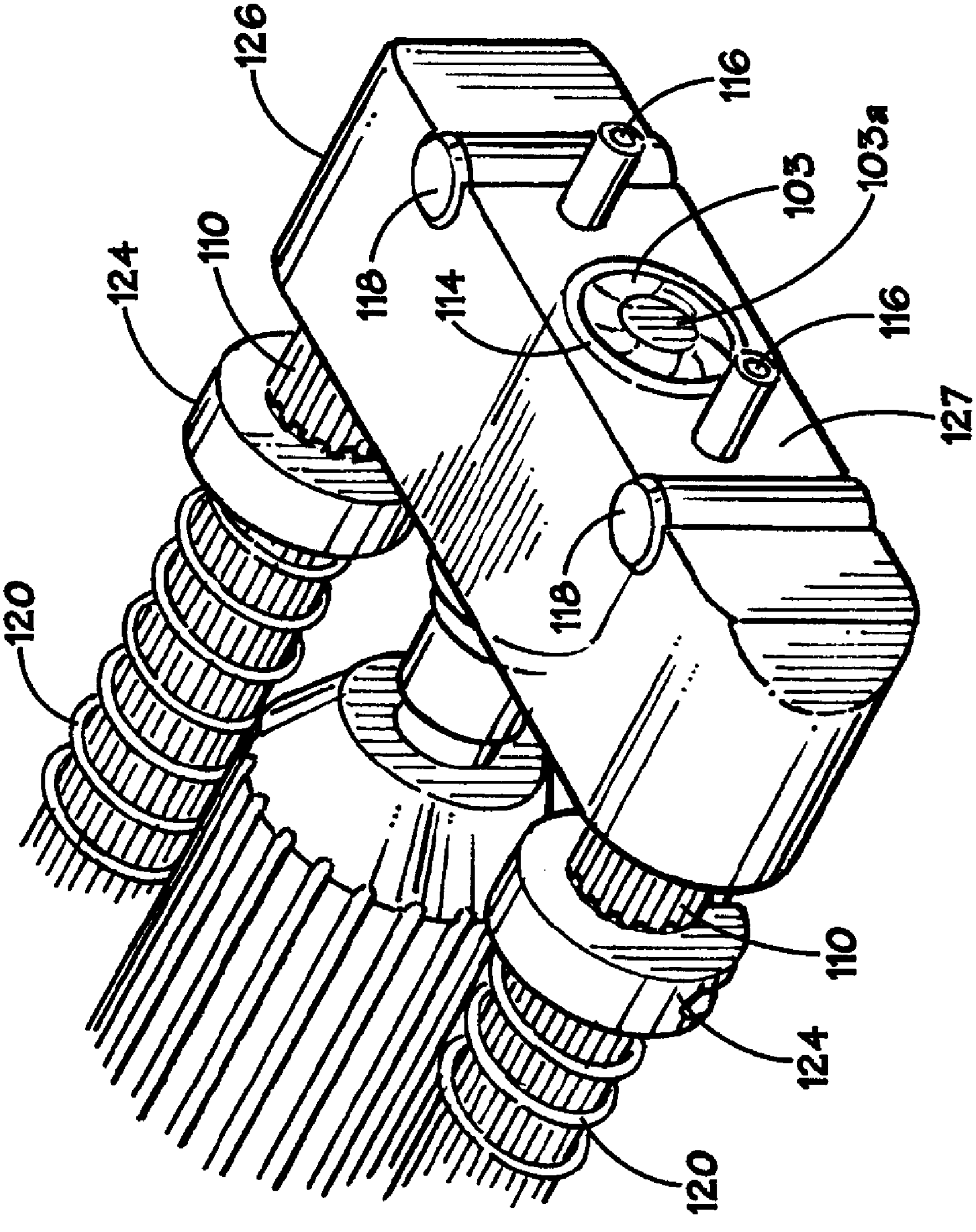
Figure 7E:
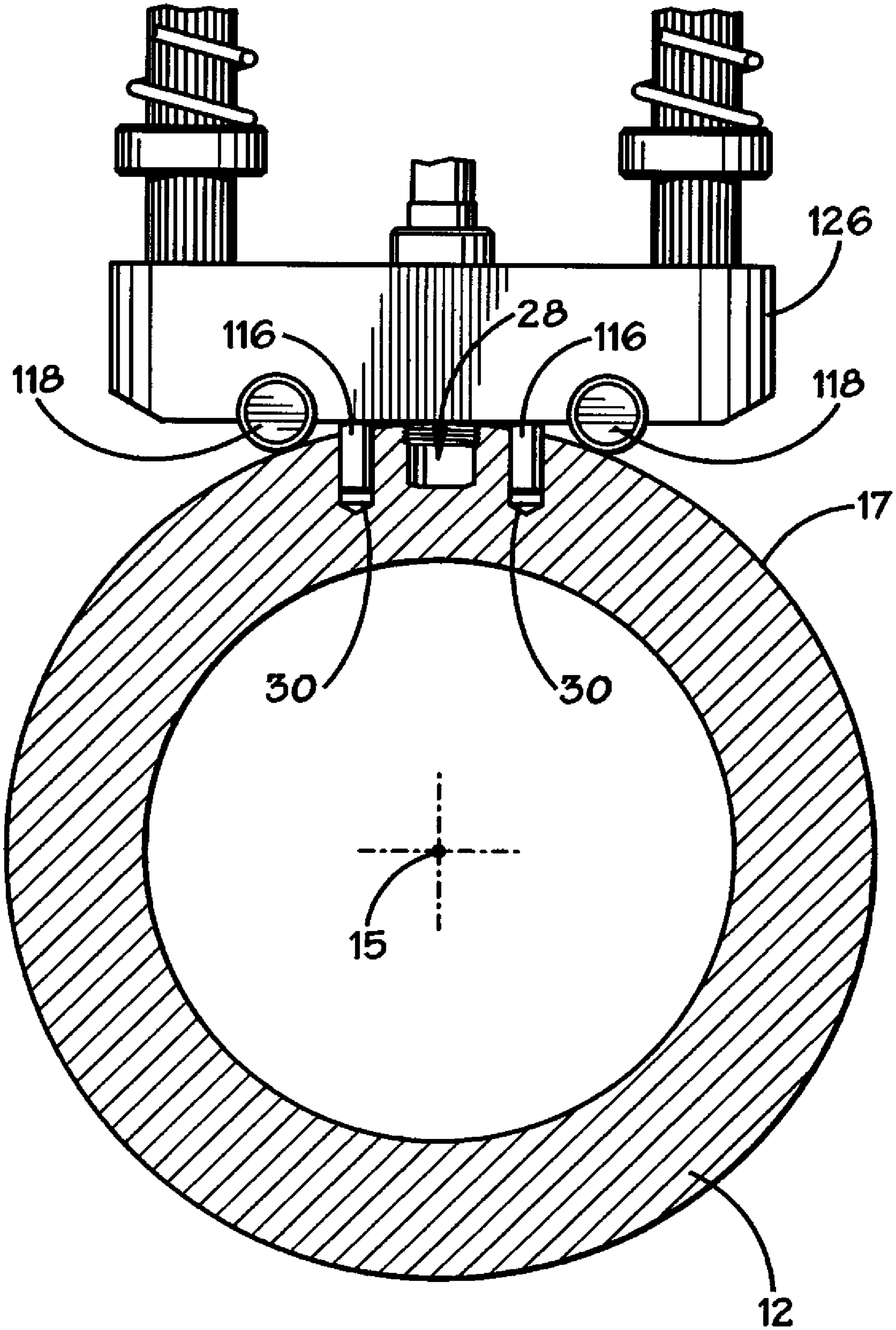

FIGS. 7A and 7B are perspective views showing the device 100 with the drill 103 in a retracted position. FIG. 7C is a perspective view of the device 100 with the drill 103 in an extended position. In the position depicted in FIG. 7C, a biasing force is created in the springs 120 that will cause the drill 103 to return to the retracted position depicted in FIGS. 7A and 7B. In use, the first and second connectors 12, 14 are threadingly coupled to one another. Thereafter, the device 100 is positioned adjacent the coupled connectors as indicated in FIG. 7E wherein the pins 116 of the device 100 are positioned in the holes 30 (see FIG. 2A) formed in the first connector 12. The pins 118 engage the exterior surface 17 of the first connector 12. As thus positioned, the device 100 is adapted to remove a portion of the second connector 14, e.g., the portion 24*a* of the lip 24 positioned within the opening 28. The diameter of the drill 103 is sized such that it does not interfere with any existing threads formed in the opening 28. The drill 103 is provided with the blunt end 103*a* to limit the travel of the drill when the end 103*a* engages the bottom 28*b* of the opening 28. In the illustrative embodiments depicted in the drawings, the drill bit 103 is a four flute drill bit having the blunt end 103*a* formed thereon. Of course, other types of devices may be used to perform the drilling and/or milling operations used to remove the portion 24*a* of the second connector 14. For example, a core drill bit or a mill bit may be employed with the device 100 depending upon the particular application.

After the portion 24*a* is removed, the device 100 may be disengaged from the mated connector pair. Thereafter, an anti-rotation member 34 is installed to prevent or reduce rotation between the mated connectors 12, 14. According to the present invention, insertion of the anti-rotation member 34 as well as any tapping or thread forming activities may be accomplished manually or through use of power tools. Additionally, irrespective of the type or configuration of the anti-rotation member 34, a chemical adhesive, such as Loctite, may be used when installing the anti-rotation member 34 in the opening 28 in an effort to reduce the chances that the anti-rotation member 34 will disengage from the opening 28. A mechanical system may also be employed. Of course, a variety of techniques and materials may be employed to reduce the chances that the anti-rotation member 34 will become disengaged from the opening 28.

Figure 8A:
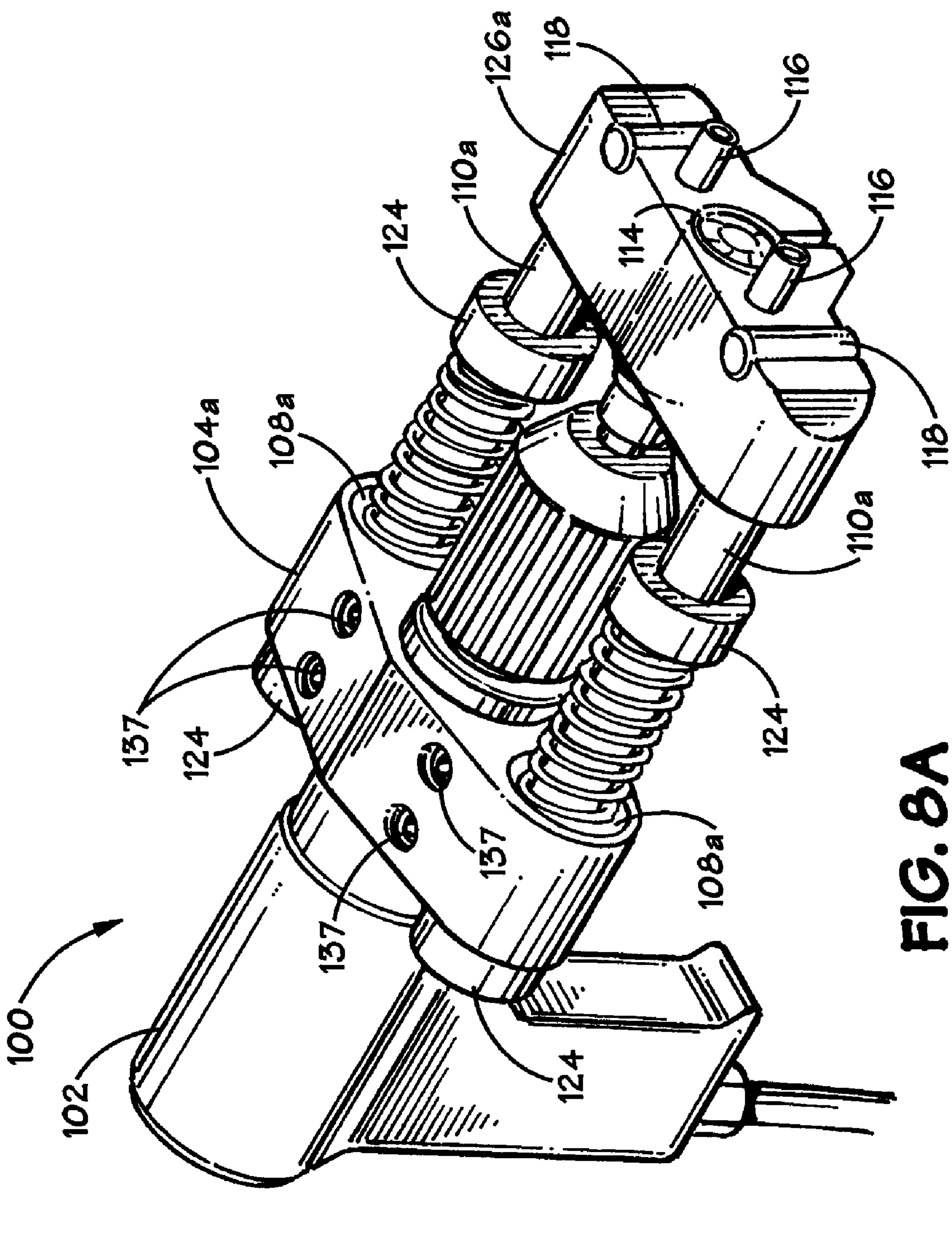
FIGS. 8A–8B depict another embodiment of an illustrative device that may be used to install the illustrative anti-rotation member described herein.
Figure 8B:
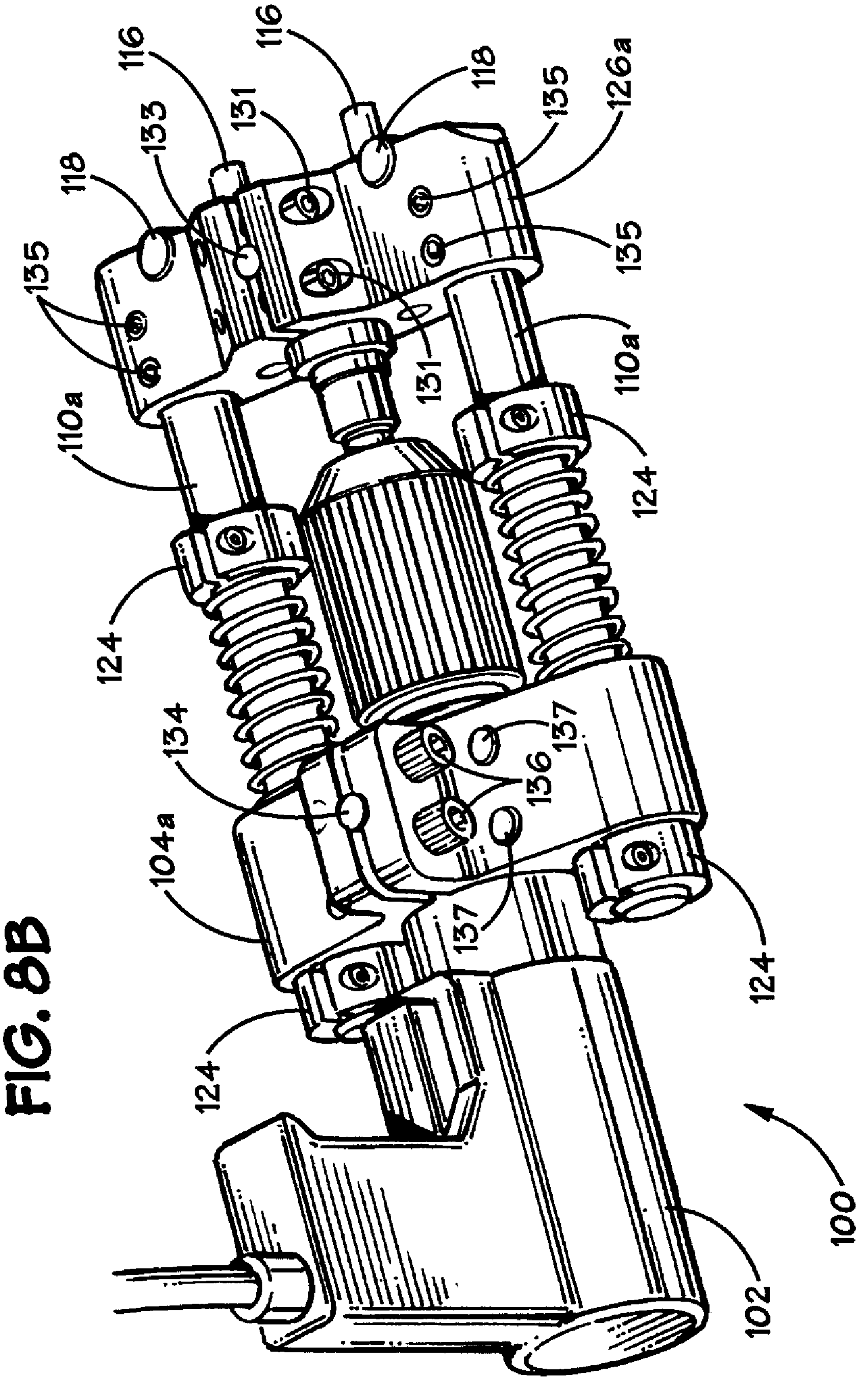

FIGS. 8A–8B depict yet another illustrative embodiment of the device 100. In this embodiment, the splines 110 are replaced with shafts 110*a* and the spline bushings 108 have been replaced with a non-splined, linear bushings 108*a*. In one particular embodiment, the shafts 110*a* are ceramic-coated aluminum shafts having a diameter of approximately 0.75 inches. The device 100 is configured so that all press fitting operations are eliminated as it relates to the assembly of the device 100. More specifically, the drill bushing 114 may be secured within the anvil bracket 126*a* by a plurality of threaded fasteners 131. A spacer bar 133 is provided to reduce the chances of over-tightening the threaded fasteners 131. Additionally, the anvil bracket 126*a* is coupled to the shafts 110*a* by a plurality of set screws 135. A chemical adhesive such as Loctite may be applied between the shafts 108*a* and the anvil bracket 126*a* prior to tightening the set screws 135. Additionally, this embodiment of the device 100 comprises a body bracket 104*a* that is configured such that it may be secured to the drill 102 by a plurality of threaded fasteners 136. A spacer bar 134 is provided to reduce the chances of over-tightening the fasteners 136. The linear bushings 108*a* are secured within the body bracket 104*a* by a plurality of threaded fasteners 137. The illustrative embodiment of the device depicted in FIGS. 8A–8B operates in substantially the same manner as does the device depicted in FIGS. 7A–7E.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A method, comprising:

threadingly coupling a first pin connector directly to a second box connector;

removing at least a portion of said second connector after said first and second connectors are coupled together to thereby define a recess in said second connector; and coupling an anti-rotation member to said first and second connectors, wherein said anti-rotation member engages at least a portion of said first connector and is adapted to engage at least a portion of said recess in said second connector.

2. The method of claim 1, wherein removing at least a portion of said second connector comprises performing at least one of a drilling operation and a milling operation to remove said portion of said second connector.

3. The method of claim 1, wherein removing at least a portion of said second connector comprises removing at least a portion of said second connector that is positioned within an area defined by an opening in said first connector.

4. The method of claim 1, wherein coupling said anti-rotation member to at least one of said first and second connectors comprises threadingly engaging said anti-rotation member with at least a portion of said first connector.

5. The method of claim 1, wherein coupling said anti-rotation member to at least one of said first and second connectors comprises threadingly engaging said anti-rotation member with at least a portion of said first connector and at least a portion of said second connector.

6. The method of claim 1, wherein said anti-rotation member has a generally cylindrical configuration.

7. The method of claim 1, wherein said anti-rotation member has external threads formed on at least a portion of an exterior surface of said anti-rotation member.

8. The method of claim 1, wherein said anti-rotation member comprises at least one of a self-tapping fastener or a threaded fastener.

9. The method of claim 1, further comprising, prior to coupling said anti-rotation member to at least one of said fist and second connectors, forming internal threads on a surface of said recess in said second connector.

10. A method, comprising:

threadingly coupling a first pin connector directly to a second box connector;

removing at least a portion of said second connector after said first and second connectors are coupled together to thereby define a recess in said second connector; and threadingly coupling an anti-rotation member to said first and second connectors.

11. The method of claim 10, wherein removing at least a portion of said second connector comprises performing at least one of a drilling operation and a milling operation to remove said portion of said second connector.

12. The method of claim 10, wherein said anti-rotation member has external threads formed on at least a portion of an exterior surface of said anti-rotation member.

13. The method of claim 10, wherein said anti-rotation member comprises at least one of a self-tapping fastener or a threaded fastener.

14. The method of claim 10, further comprising, prior to threadingly coupling said anti-rotation member to said first and second connectors, forming internal threads on a surface of said recess in said second connector.

15. A method, comprising:

threadingly coupling a first pin connector directly to a second box connector, said first connector having an opening formed therein;

after said first and second connectors are coupled together, removing at least a portion of said second connector positioned within an area defined by said opening; and inserting an anti-rotation member in said opening wherein said anti-rotation member engages at least a portion of said first connector and is adapted to engage at least a portion of a recess in said second connector.

16. The method of claim 15, wherein removing at least a portion of said second connector comprises performing at least one of a drilling operation and a milling operation to remove said portion of said second connector.

17. The method of claim 15, wherein inserting said anti-rotation member in said opening comprises threadingly engaging said anti-rotation member with at least a portion of said first connector.

18. The method of claim 15, wherein coupling said anti-rotation member to at least one of said first and second connectors comprises threadingly engaging said anti-rotation member with at least a portion of said first connector and at least a portion of said second connector.

19. The method of claim 15, further comprising, prior to inserting said anti-rotation member, forming internal threads on a surface of said recess formed in said second connector.

* * * * *